(12) United States Patent
Chevillard

(10) Patent No.: US 12,331,597 B2
(45) Date of Patent: Jun. 17, 2025

(54) COMPOSITE CABLE ROPE SOCKET

(71) Applicant: Schlumberger Technology Corporation, Sugar Land, TX (US)

(72) Inventor: Francois Chevillard, Abbeville (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/560,613

(22) PCT Filed: May 13, 2022

(86) PCT No.: PCT/US2022/029134
§ 371 (c)(1),
(2) Date: Nov. 13, 2023

(87) PCT Pub. No.: WO2022/241185
PCT Pub. Date: Nov. 17, 2022

(65) Prior Publication Data
US 2024/0254841 A1  Aug. 1, 2024

(30) Foreign Application Priority Data

May 14, 2021 (EP) ..................................... 21305634

(51) Int. Cl.
*E21B 17/02* (2006.01)
*F16G 11/04* (2006.01)

(52) U.S. Cl.
CPC .......... *E21B 17/028* (2013.01); *F16G 11/042* (2013.01)

(58) Field of Classification Search
CPC .... E21B 17/023; E21B 17/026; E21B 17/028; E21B 17/0285
See application file for complete search history.

(56) References Cited

U.S. PATENT DOCUMENTS

| 3,452,815 A | * | 7/1969 | Watkins | E21B 43/01 |
| | | | | 166/344 |
| 2016/0053556 A1 | * | 2/2016 | Vanegas | E21B 17/026 |
| | | | | 166/243 |
| 2018/0090874 A1 | * | 3/2018 | Frey | E21B 17/028 |
| 2019/0109450 A1 | * | 4/2019 | Mangum | H02G 15/04 |
| 2020/0217147 A1 | * | 7/2020 | Massey | E21B 17/023 |
| 2020/0217148 A1 | * | 7/2020 | Massey | E21B 17/028 |

* cited by examiner

*Primary Examiner* — David Carroll
(74) *Attorney, Agent, or Firm* — Jeffrey D. Frantz

(57) ABSTRACT

Apparatus and methods for coupling a rope socket with an armored cable. The armored cable includes a conductor core having one or more cables for transmitting electrical and/or optical signals and at least one layer of armor wires wound around the conductor core. The rope socket includes a housing having an uphole end through which the armored cable extends into the housing and a downhole end through which the conductor core extends from the housing to a component of downhole equipment suspended in a wellbore by the armored cable. The armor wires are arranged inside of the housing so that they are spaced apart at least locally from the conductor core. A plastic material disposed within the housing fills interstices each defined by one or more surfaces of one or more of the conductor core, one or more of the armor wires, and the housing.

12 Claims, 7 Drawing Sheets

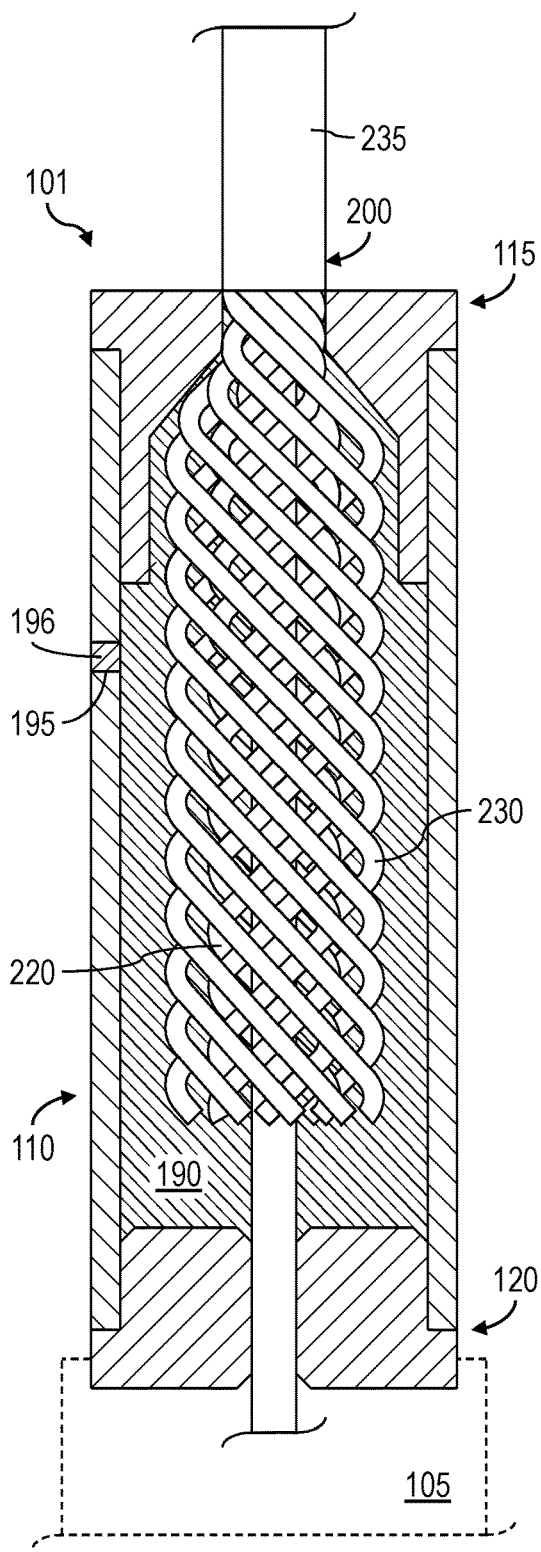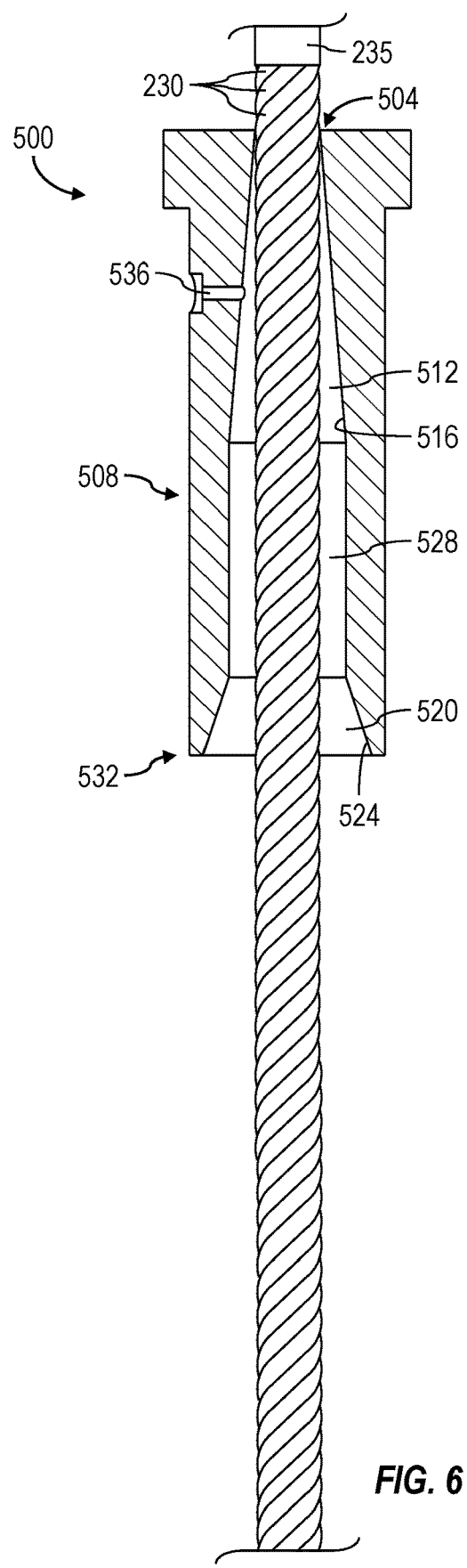
FIG. 5
FIG. 6

COMPOSITE CABLE ROPE SOCKET

CROSS-REFERENCE TO RELATED APPLICATIONS

The present application is a National Stage Entry of International Application No. PCT/US2022/029134, dated May 13, 2022, which claims priority benefit of European Patent Application No. 21305634.4, filed May 14, 2021, the entirety of which is incorporated by reference herein and should be considered part of this specification.

BACKGROUND OF THE DISCLOSURE

Wirelines are used to lower tool strings into wellbores. An electrical connection is used to connect one or more wireline logging tools of the tool string to surface equipment. Such wirelines can be routed through a pulley or sheave at the surface (e.g., as part of a drilling rig) and spooled on a reel of a wireline surface unit. From the reel, wiring can connect the wireline tool string to other surface equipment.

A rope socket assembly is one example by which the wireline tool string is mechanically and electrically connected to the wireline. Making the electrical connections from the wireline to the wireline tool string is time consuming, and the mechanical and electrical connections are prone to failure if armored layers of the wireline are not uniformly loaded.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a rope socket coupled with an armored cable. The armored cable includes a conductor core having one or more cables for transmitting electrical and/or optical signals and at least one layer of armor wires wound around the conductor core. The rope socket includes a housing having an uphole end through which the armored cable extends into the housing and a downhole end through which the conductor core extends from the housing. The armor wires are arranged inside of the housing so that they are spaced apart at least locally from the conductor core. The rope socket also includes a plastic material disposed within the housing and filling interstices each defined by one or more surfaces of one or more of the conductor core, one or more of the armor wires, and the housing.

The present disclosure also introduces a system that includes and armored cable and an armored cable rope socket. The armored cable includes a conductor core having one or more conductors for transmitting electrical and/or optical signals between surface equipment at a wellsite surface and downhole equipment suspended by the armored cable in a wellbore that extends between the wellsite surface and a subterranean formation. The armored cable also includes at least one layer of armor wires wound around the conductor core. The armored cable rope socket includes a housing having first and second ends. The armored cable extends into the housing through the first end. The conductor core extends from the housing through the second end to a component of the downhole equipment. The armor wires are arranged inside of the housing so that they are spaced apart at least locally from the conductor core. The armored cable rope socket also includes a plastic material disposed within the housing and filling interstices each defined by one or more surfaces of one or more of the conductor core, one or more of the armor wires, and the housing.

The present disclosure also introduces a method that includes passing an end of an armored cable through an uphole end of a housing. The armored cable includes a conductor core having one or more cables for transmitting electrical and/or optical signals. The armored cable also includes at least one layer of armor wires collectively extending around the conductor core. Portions of each armor wire of the at least one layer are then unwrapped to expose the conductor core. The unwrapped portions of the armor wires are then rewrapped around the exposed conductor core so that the armor wires are at least locally spaced apart from the conductor core. The housing is then positioned so that the rewrapped portions of the armor wires are located inside the housing. A plastic material is then injected into the housing to fill interstices each defined by one or more surfaces of one or more of the conductor core, one or more of the rewrapped portions of the armor wires, and the housing.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 5 is a sectional view of at least a portion of another example implementation of the apparatus shown in FIG. 1 according to one or more aspects of the present disclosure.

FIG. 6 is a sectional view of at least a portion of another example implementation of the apparatus shown in FIG. 1 in a stage of manufacture according to one or more aspects of the present disclosure.

DETAILED DESCRIPTION

Figure 1:
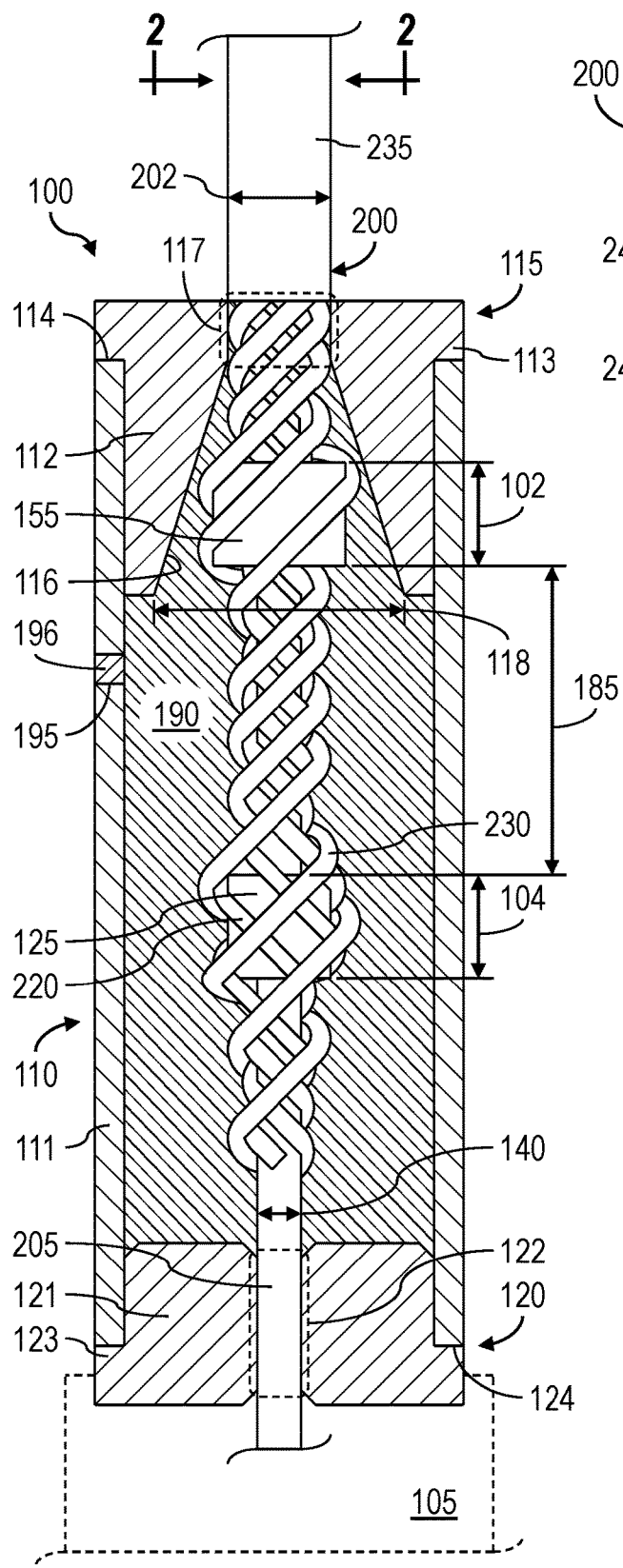
FIG. 1 is a sectional view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a sectional view of at least a portion of an example implementation of a composite or "armored" cable rope socket 100 according to one or more aspects of the present disclosure. The rope socket 100 may be utilized for mechanically and communicably connecting an armored cable 200 to a downhole tool string 105 (depicted in FIG. 1 by phantom lines).

Figure 2:
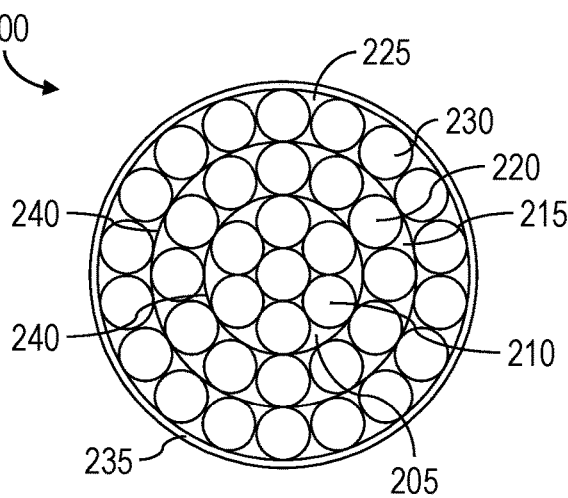
FIG. 2 is a sectional view of at least a portion of an example implementation of an armored cable according to one or more aspects of the present disclosure.

FIG. 2 is a sectional view of at least a portion of an example implementation of the armored cable 200 shown in FIG. 1. The armored cable 200 comprises a conductor core 205 that comprises one or more conductors and/or other cables 210 for transmitting electrical and/or optical signals, such as for delivering electrical power to the downhole tool string 105 and/or communicating electrical and/or optical signals between the downhole tool string 105 and surface equipment disposed at a wellsite surface (e.g., see FIG. 10). Although the conductor core 205 is for a wireline cable that includes seven cables 210 in the example implementation shown in FIG. 2, other implementations also within the scope of the present disclosure may include a conductor core 205 having more or fewer than seven cables 210, including implementations in which the conductor core 205 is for a slickline cable that comprises just one cable 210.

The armored cable 200 also comprises an inner armor layer 215 comprising a plurality of inner armor wires 220 wound around the conductor core 205. Although the inner armor layer 215 includes twelve inner armor wires 220 in the example implementation shown in FIG. 2, other implementations also within the scope of the present disclosure may include an inner armor layer 215 having more or fewer than twelve inner armor wires 220. The inner armor wires 220 may be wound around the conductor core 205 in a helical, braided, and/or other manner.

The armored cable 200 also comprises an outer armor layer 225 comprising a plurality of outer armor wires 230 wound around the conductor core 205. Although the outer armor layer 225 includes eighteen outer armor wires 230 in the example implementation shown in FIG. 2, other implementations also within the scope of the present disclosure may include an outer armor layer 225 having more or fewer than eighteen outer armor wires 230. The outer armor wires 230 may be wound around the inner armor layer 215 in a helical, braided, and/or other manner. For example, the inner armor wires 220 and the outer armor wires 230 may be helically wound in opposite directions (e.g., clockwise and counterclockwise).

The inner and/or outer armor wires 220/230 permit protection of the conductor core 205 and have a carrying effect of the conductor core 205. The inner and/or outer armor wires 220/230 may be metallic. One or more of the inner and/or outer armor wires 220/230 may comprise a reinforcement element including a bundle of reinforcement fibers comprising at least one fiber and a thermoset (or thermoplastic) matrix impregnating the bundle of fibers. Such reinforcement element may be encased with a thermoplastic coating. Examples of cables according to such implementation are detailed in PCT Patent Application No. PCT/EP2020/077139, filed Sep. 28, 2020, the entire disclosure of which is hereby incorporated herein by reference.

The armored cable 200 may also comprise an outer layer 235, such as may comprise a friction reducing material to reduce friction between the armored cable 200 and inner surfaces of the wellbore. The armored cable 200 may also comprise intermediate layers 240 for various mechanical and electrical protection (e.g., shielding). Further, although not explicitly illustrated in FIG. 2, the conductor core, 205, the cables 210, the inner armor wires 220, and/or the outer armor wires 230 may individually comprise protective coatings, such as for insulative purposes.

FIG. 2 describes an example implementation of an armored cable 200 but other types of armored cables having at least a conductor core 205 and a layer of armor wires 220/230 may be considered as part of the disclosure, including armored cables with more or less than two layers of armored wires 220/230. In such implementations, among others within the scope of the present disclosure, the armor wires may be made of various materials, such as composite material or metallic material.

Returning to FIG. 1, the rope socket 100 comprises a housing 110 having an uphole end 115 and a downhole end 120. The armored cable 200 extends into the housing 110 through the uphole end 115. The conductor core 205 extends from the housing 110 through the downhole end 120. The housing 110 may be formed from metallic and/or plastic materials.

Figure 3:
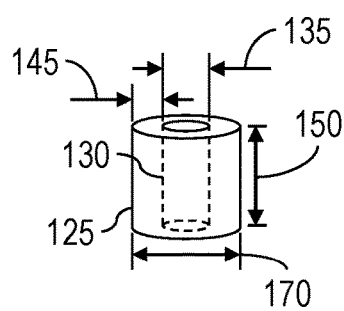
FIG. 3 is a perspective view of an example implementation of a spacer according to one or more aspects of the present disclosure.

Within the housing 110, a first (or "lower" or "inner") spacer 125 radially interposes the conductor core 205 and the plurality of inner armor wires 220. FIG. 3 is a perspective view of an example implementation of the first spacer 125 according to one or more aspects of the present disclosure. The first spacer 125 may be annular, thus comprising a longitudinal inner passage 130 having a diameter 135 not smaller than a diameter 140 of the conductor core 205. For example, the diameter 135 of the passage 130 may be about 5% to 10% larger than the diameter 140 of the conductor core 205. The radial thickness (i.e., half the difference between the outer and inner diameters) 145 of the first spacer 125 may be equal to about 100% to 200% of the individual diameter of one or more (or each) of the inner armor wires 220 and/or the outer armor wires 230. The axial length 150 of the first spacer 125 may be about 2-5 centimeters. As shown in FIG. 1, the first spacer 125 surrounds the conductor core 205, and the inner armor wires 220 wrap around the first spacer 125 and the portions of the conductor core 205 that are not covered by the first spacer 125. Accordingly, the outer armor wires 230 wrap around the inner armor wires 220, including the portions of the inner armor wires 220 wrapped around the first spacer 125.

Figure 4:
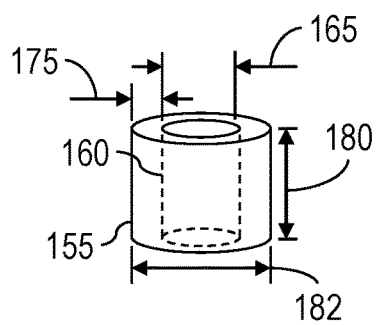
FIG. 4 is a perspective view of an example implementation of another spacer according to one or more aspects of the present disclosure.

As also shown in FIG. 1, a second (or "upper" or "outer") spacer 155 radially interposes the plurality of inner armor wires 220 and the plurality of outer armor wires 230. FIG. 4 is a perspective view of an example implementation of the second spacer 155 according to one or more aspects of the present disclosure. The second spacer 155 may be annular, thus comprising a longitudinal inner passage 160 having a diameter 165 not smaller than the sum of the outer diameter 170 of the first spacer 125 and twice the diameter of the individual inner armor wires 220. For example, the diameter 165 of the passage 160 may be about 5% to 10% larger than this sum. The radial thickness 175 of the second spacer 155 may be equal to about 100% to 200% of the individual diameter of one or more (or each) of the inner armor wires 220 and/or the outer armor wires 230. The axial length 180 of the second spacer 155 may be about 2-7 centimeters. As shown in FIG. 1, the second spacer 155 surrounds a portion of the conductor core 205 that is wrapped by the inner armor wires 220 but axially offset from the first spacer 125 by a predetermined distance 185 such that the second spacer 155 does not radially overlap any portion of the first spacer 125. The predetermined distance 185 may be not less than the axial length 150 of the first spacer 125 or the axial length 180 of the second spacer 155.

Accordingly, within an axial portion 102 of the rope socket 100 delineated by axial ends of the second spacer 155, the inner armor wires 220 wrap (e.g., loosely or tightly) around the conductor core 205, the second spacer 155 extends around the inner armor wires 220, and the outer armor wires 230 wrap (e.g., loosely or tightly) around second spacer 155. Within an axial portion 104 of the rope socket 100 delineated by axial ends of the first spacer 125, the first spacer 125 extends around the conductor core 205, the inner armor wires 220 wrap (e.g., loosely or tightly) around the first spacer 125, and the outer armor wires 230 wrap (e.g., loosely or tightly) around the inner armor wires 220. Within the axial portion of the rope socket 100 defined by the predetermined distance 185 separating the first spacer 125 from the second spacer 155, as well as an axial portion uphole of the portion 102 and an axial portion downhole of the portion 104, inner armor wires 220 wrap (e.g., loosely or tightly) around the conductor core 205, and the outer armor wires 230 wrap (e.g., loosely or tightly) around the inner armor wires 220.

The example rope socket 100 shown in FIG. 1 is depicted as including two spacers, namely the upper spacer 155 and the lower spacer 125. However, other implementations also within the scope of the present disclosure may include the spacers 125/155 in a different relative orientation, or spacers other than those depicted in FIGS. 1, 3, and 4, or more/fewer spacers. For example, FIG. 5 depicts another example implementation in which the inner and outer armor wires 220/235 have been unwrapped and then loosely rewrapped around the conductor core 205 without including either spacer 125/155. Thus, the following description relative to FIG. 1 is also applicable (or readily adaptable) to FIG. 5.

A thermoset or other plastic material 190 is disposed within the housing 110 to fill each interstice defined by one or more surfaces of one or more of the conductor core 205, the first spacer 125, one or more of the inner armor wires 220, the second spacer 155, one or more of the outer armor wires 230, and internal surfaces of the housing 110. The thermoset material 190 may be or comprise a (for example, rigid dielectric) polyurethane and/or epoxy. Although not limited as such within the scope of the present disclosure, commercial examples may include HAPCO's DI-PAK R-series epoxies and MASTER BOND's EP110F8-1 epoxy, among myriad others. The thermoset or other plastic material 190 may instead be a thermoplastic material, such as may be installed within the housing 110 via thermoplastic injection. Thus, further reference herein to the thermoset material 190 is deemed to refer to either thermoset or thermoplastic material, although other injectable plastic materials are also contemplated. In an example implementation, when the armor wire includes a reinforcement element as described above, with a plastic matrix, the plastic material 190 may be of the same type (i.e., thermoplastic or thermoset) as the plastic matrix or compatible in term of bonding with the plastic matrix. In such case, the plastic material may comprise a common material with the plastic matrix of the reinforcement element of the armor wire or be of the same composition as the plastic matrix, to facilitate mechanical attachment of both materials.

The thermoset material 190 may be a polymer matrix embedded with fibrous, particulate, or spherical glass, carbon, aramid, or basalt reinforcement members. The thermoset material 190 may also comprise, instead of or in addition to the polymer matrix embedded with the reinforcement members, a polymer matrix not embedded with reinforcement members.

FIG. 1 also illustrates that the uphole end 115 of the housing 110 is defined by a truncated conical surface 116 that narrows to an opening 117 through which the armored cable 200 extends. The opening 117 may have a diameter that is not more than about 5% larger than an outer diameter 202 of the armored cable 200. The second spacer 155 may be axially (longitudinally) disposed in a frustum-shaped volume defined by the conical surface 116. That is, the second spacer 155 may be axially positioned between the longitudinally opposing edges of the conical surface 116. The conical surface 116 may widen to a maximum diameter 118 that is not less than the sum of the outer diameter 182 of the second spacer 155 and twice the diameter of each outer armor wire 230.

The housing 110 may comprise a cylindrical member 111 and an upper cap 112 coupled with the cylindrical member 111, wherein the upper cap 112 comprises the conical surface 116. The upper cap 112 and the thermoset material 190 may cooperatively seal a volume containing the first and second spacers 125, 155 within the housing 110. For example, such sealing may prevent the incursion of wellbore fluid into the rope socket 100. However, such sealing, if existent, may be accomplished via other means.

As depicted in the example implementation of FIG. 1, the upper cap 112 may be a single discrete member that extends into the cylindrical member 111 such that a shoulder 113 of the upper cap 112 abuts the upper end 114 of the cylindrical member 111. However, the upper cap 112 may take other forms in other implementations also within the scope of the present disclosure. Furthermore, the upper cap 112 and the cylindrical member 111 may be integral in the form of a single discrete member, such as depicted in FIGS. 5-9 described below.

The housing 110 may further comprise a lower cap 121 coupled with the cylindrical member 111 opposite the upper cap 112. The lower cap 121 may aid the thermoset material 190 to fully fill the interstices within the housing 110 (i.e., the interstices between the conductor core 205, the spacers 125, 155, and the inner and outer armor wires 220, 230) during injection of the uncured thermoset material 190 into the housing 110. However, this may also be accomplished via other means/processes in implementations lacking the lower cap 121, such as depicted in FIGS. 5-9 described below. The lower cap 121 may form the downhole end 120 and comprise an opening 122 through which the conductor core 205 extends from the housing 110. As with the upper cap 112, the lower cap 121 may be a single discrete member that extends into the cylindrical member 111 such that a shoulder 123 of the lower cap 121 abuts the lower end 124 of the cylindrical member 111. However, the lower cap 121 may take other forms in other implementations also within the scope of the present disclosure.

The upper cap 112, the lower cap 121, and the thermoset material 190 may cooperatively seal a volume containing the first and second spacers 125, 155 within the housing 110, such as may prevent the incursion of wellbore fluid into the rope socket 100. However, such sealing, if existent, may be accomplished via other means.

The housing 110 may comprise a fill port 195 through which the uncured thermoset material 190 may be injected into the housing 110 before the thermoset material is thermally cured. When the material 190 is a thermoplastic material, it is injected in a melted state and there is no curing of the thermoplastic material. After the injection, a plug, cover, and/or other means 196 may seal the port 195, such as to prevent incursion of wellbore fluid into the rope socket 100 via the port 195.

FIGS. 6-10 sequentially depict an example implementation of a composite cable rope socket 500 during stages of manufacture according to one or more aspects of the present disclosure. The rope socket 500 comprises same or similar features of the rope socket 100 depicted in FIGS. 1-5, including where indicated by the same reference numerals.

In FIG. 6, the armored cable 200 is inserted through an upper end 504 of a rope socket housing 508. As described above, the armored cable 200 may include an outer layer 235. In such implementations, a portion of the outer layer 235 is removed to expose the outer armor wires 230.

The housing 508 is similar to the housing 110 shown in FIGS. 1 and 5. The housing 508 is depicted in FIG. 6 as a single, discrete member, although in other implementations the housing 508 may comprise a plurality of components coupled together. The housing 508 may be formed from metallic and/or plastic materials.

An internal volume of the housing 508 includes an upper frustum-shaped volume 512 defined by an internal conical surface 516, a lower frustum-shaped volume 520 defined by another internal conical surface 524, and a cylindrical volume 528 interposing the upper and lower frustum-shaped volumes 512, 520. The upper volume 512 tapers downward from the upper housing end 504 to the cylindrical volume 528, and the lower volume 520 tapers downward from the cylindrical volume to a lower end 532 of the housing 508. Other aspects of the housing 508 may be as or similar to the above-described aspects of the housing 110 shown in FIGS. 1 and 5. For example, the housing 508 may also include a fill port 536 at least functionally similar to the fill port 195 depicted in FIGS. 1 and 5.

Figure 7:
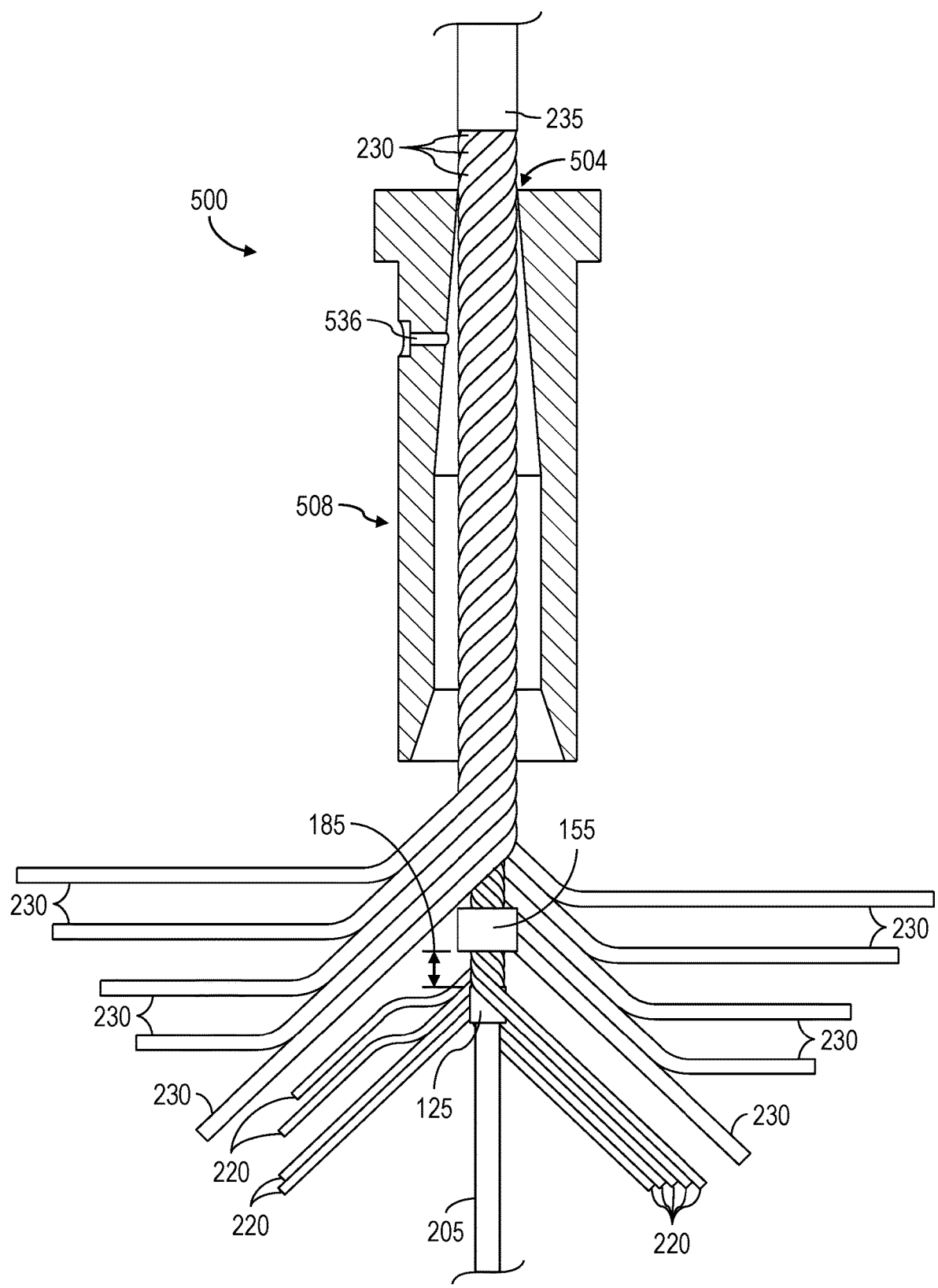
FIG. 7 is a sectional view the apparatus shown in FIG. 6 in a subsequent stage of manufacture according to one or more aspects of the present disclosure.

FIG. 7 depicts a manufacturing stage subsequent to the stage depicted in FIG. 6, in which portions of the outer armor wires 230 have been unwound from around the inner armor wires 220 and the second spacer 155 has been positioned over the inner armor wires 220. Below the second spacer 155, portions of the inner armor wires 220 have been unwound from the conductor core 205 and the first spacer 125 has been positioned around the conductor core 205. The predetermined distance 185 between the first and second spacers 125, 155 is as described above with respect to FIG. 1. FIG. 7 also depicts two of the inner armor wires 220 partially rewrapped around the first spacer 125.

Figure 8:
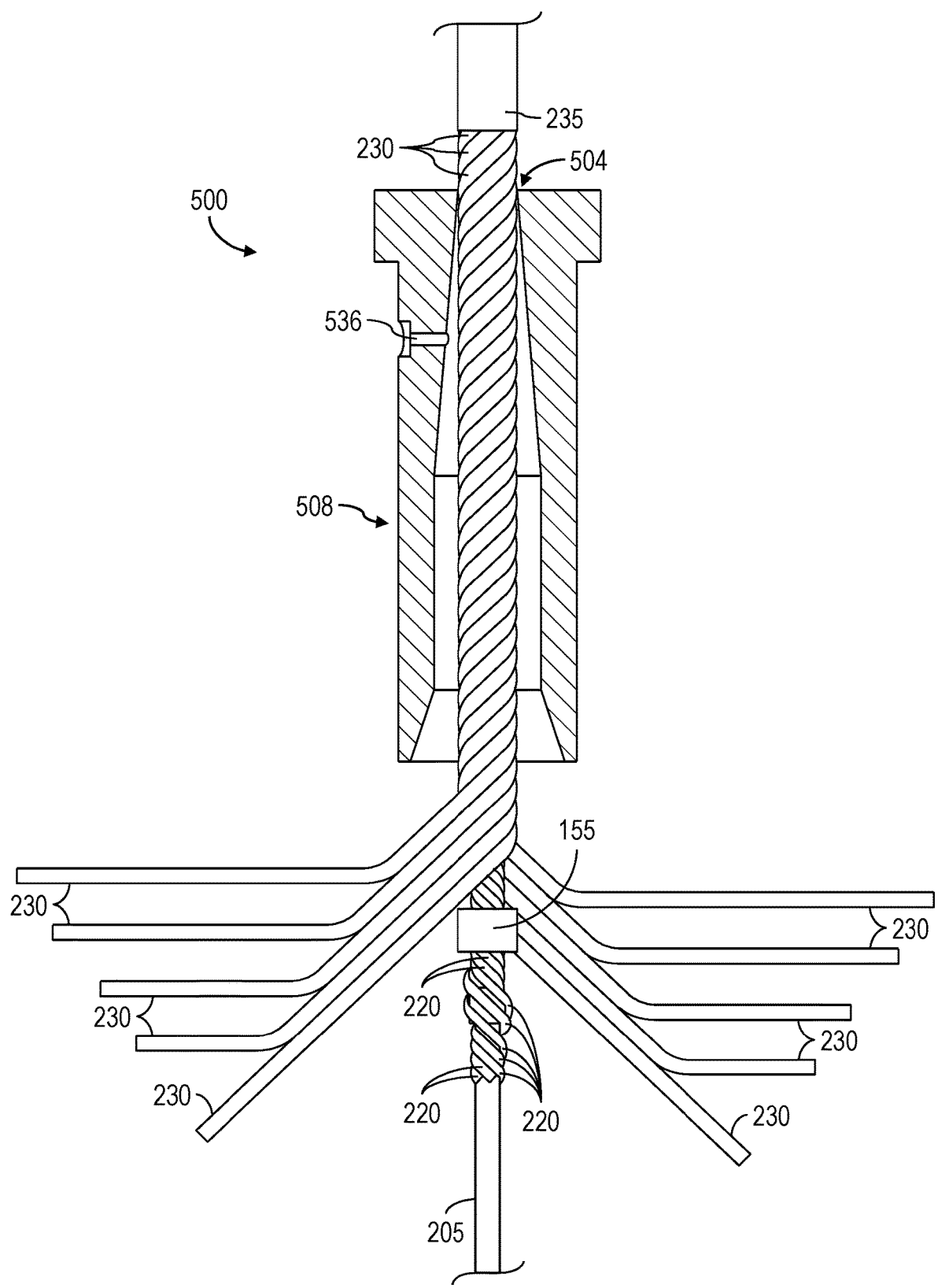
FIG. 8 is a sectional view the apparatus shown in FIG. 7 in a subsequent stage of manufacture according to one or more aspects of the present disclosure.
Figure 9:
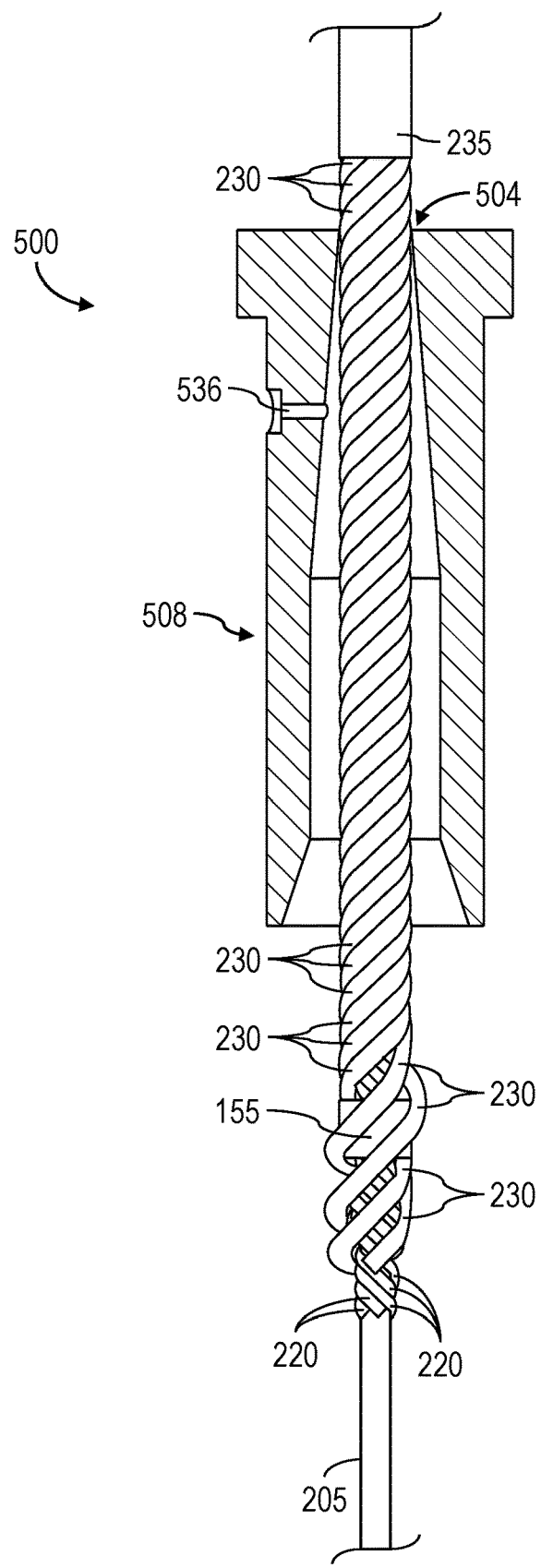
FIG. 9 is a sectional view of the apparatus shown in FIG. 8 in a subsequent stage of manufacture according to one or more aspects of the present disclosure.

FIG. 8 depicts a manufacturing stage subsequent to the stage depicted in FIG. 7 in which the inner armor wires 220 have been fully rewrapped (e.g., tightly or loosely) around the first spacer 125 and the conductor core 205. FIG. 9 depicts a manufacturing stage subsequent to the stage depicted in FIG. 8 in which the outer armor wires 230 have been fully rewrapped (e.g., tightly or loosely) around the second spacer 155 and the inner armor wires 220 that were rewrapped around the first spacer 125. Thus, as described above, the first spacer 125 interposes the conductor core 205 and the rewrapped inner armor wires 220, the second spacer 155 interposes the originally wrapped inner armor wires 220 and the rewrapped outer armor wires 230, and the first and second spacers 125, 155 are axially offset by the predetermined distance 185.

Figure 10:
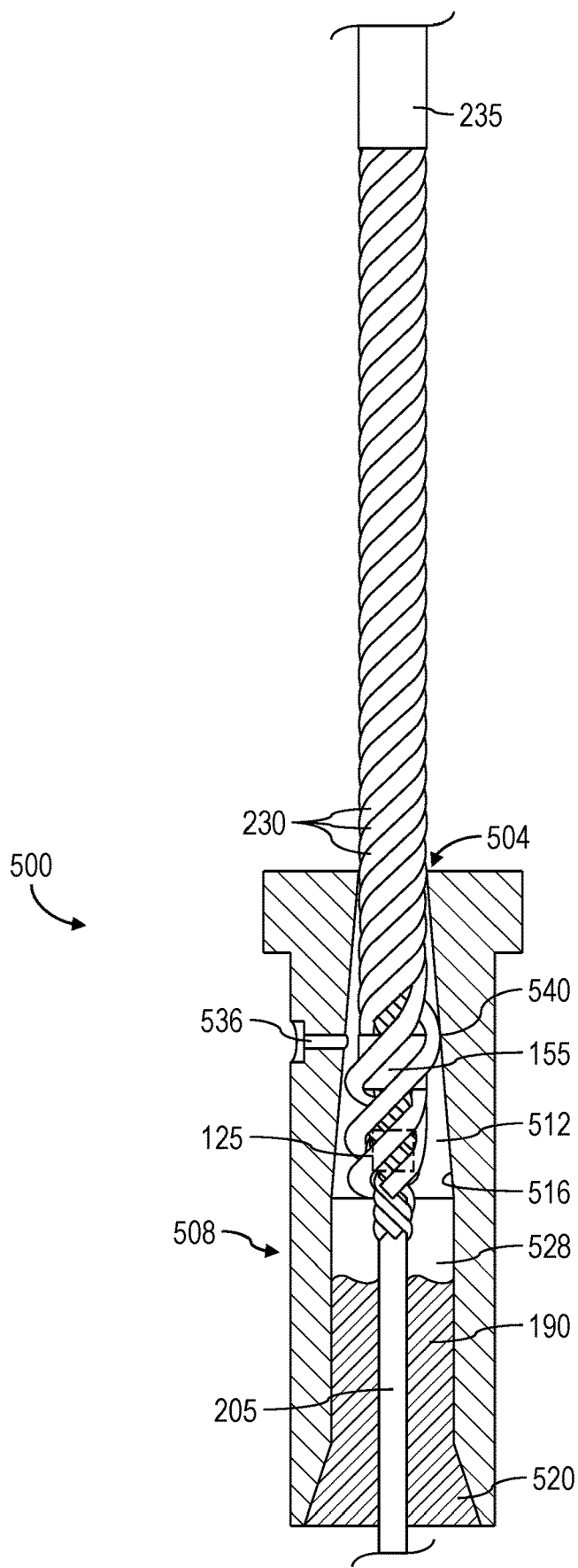
FIG. 10 is a sectional view the apparatus shown in FIG. 9 in a subsequent stage of manufacture according to one or more aspects of the present disclosure.

FIG. 10 depicts a manufacturing stage subsequent to the stage depicted in FIG. 9 in which the housing 508 has been repositioned relative to the armored cable 200 such that the first spacer 125 (depicted by phantom lines) and the second spacer 155, having been rewrapped within the inner and outer armor wires 220, 230, respectively, are now positioned within the upper frustum-shaped volume 512 within the housing 508. Such repositioning, along with uniform azimuthal and/or longitudinal spacing of the outer armor wires 230 when rewrapping around the second spacer 155, may result in one, several, or each rewrapped outer armor wire 230 having a contact point 540 where that rewrapped outer armor wire 230 is in abutment with (i.e., radially sandwiched between) both the second spacer 155 and the conical surface 516.

The conical surface 516 may also present one or more advantages. For example, when the housing 508 is being repositioned by applying opposing tension forces to the housing 508 and the armored cable 200, the conical surface 516 may aid in compressing the armor wires 220/230 around the spacers 125/155. Such compression of the armor wires 220/230 around the spacers 125/55 may be advantageous when performed prior to the thermoset material 190 being injected into the volumes 520/528 or prior to the curing and/or other setting of the material 190 within the volumes 520/528 as it improves the mechanical properties of the rope socket.

FIG. 10 also depicts the thermoset material 190 filling the lower frustum-shaped volume 520 and a portion of the cylindrical volume 528, although it will be understood that such depiction is merely for the sake of clarity and ease of understanding the illustration, and that the entireties of the upper frustum-shaped volume 512, the cylindrical volume 528, and the lower frustum-shaped volume 520 will be filled by the thermoset material 190, thus completing this example implantation of the composite cable rope socket 500.

Figure 11:
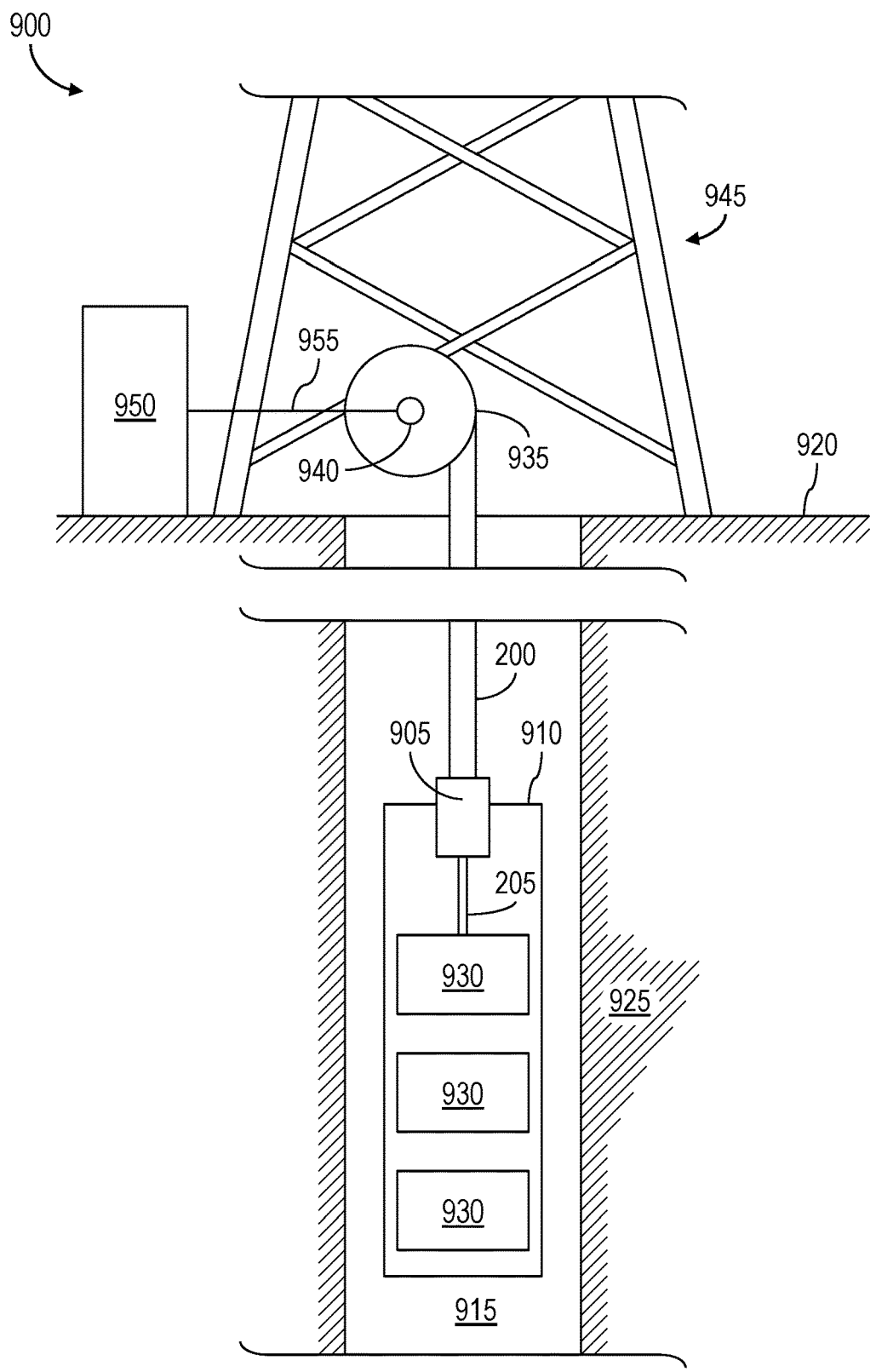
FIG. 11 is a schematic view of at least a portion of an example implementation of apparatus according to one or more aspects of the present disclosure.

FIG. 11 is a schematic view of at least a portion of an example implementation of a system 900 incorporating the armored cable 200 and a composite cable rope socket 905 according to one or more aspects of the present disclosure. The armored cable 200 is as described above and is mechanically, electrically, and/or optically connected with a logging tool string and/or other downhole equipment 910 in a wellbore 915 via the rope socket 905. The wellbore 915 may extend from a wellsite surface 920 into one or more subterranean formations 925. Within the downhole equipment 910, one or more conductors/cables 210 (see FIG. 2) of the conductor core 205 are connected to one or more components 930 of the downhole equipment 910. At the wellsite surface 920, the armored cable 200 is sheaved on a cable reel 935, and one or more conductors/cables 210 of the conductor core 205 are connected to a collector and/or other electrical and/or optical connector(s) 940 of the cable reel 935. The cable reel 935 may be supported by a rig 945 and/or other means (e.g., a wireline services truck). Electronic surface equipment 950 is connected to the connector (s) 940 via one or more connections 955. Accordingly, the conductor core 205 may be utilized to transmit electrical and/or optical signals between the surface equipment 950 and the downhole equipment 910 suspended by the armored cable 200 in the wellbore 915.

A rope socket according to one or more aspects of the present disclosure may aid in distributing (e.g., spreading) tensile load of the armored cable to each of the armor wires, contrary to conventional rope sockets. This is of particular interest when the armor wires are made of composite material. For example, in such implementations, the armored cable is anisotropic and exhibits low radial strength, such that distributing the axial load aids in permitting the cable to carry heavier downhole equipment. Moreover, utilizing the same thermoset (or thermoplastic) material as both the matrix forming the armor wires and the socket-filling material may also aid in evenly transferring tensile load to the armor wires. These and/or other aspects of the present disclosure may result in a rope socket having a high strength, perhaps as high as the breaking strength of the armored cable. Furthermore, a rope socket according to one or more aspects of the present disclosure may also be simpler and cheaper to manufacture because the rope socket includes just a few simple components, namely, a simple machined housing (which may be a single machined component) and the above-described thermoset (or thermoplastic) material, and perhaps one or more spacers. Additionally, the metallic component(s) of the rope socket may be reusable (e.g., after removing the thermoset material filling the rope socket by, for example, baking at high temperature).

In view of the entirety of the present disclosure, including the figures and the claims, a person having ordinary skill in the art will readily recognize that the present disclosure introduces an apparatus comprising a rope socket coupled with an armored cable, wherein the armored cable comprises a conductor core comprising one or more cables for transmitting electrical and/or optical signals and at least one layer comprising a plurality of armor wires wound around the conductor core, and wherein the rope socket comprises: a housing having an uphole end through which the armored cable extends into the housing and a downhole end through which the conductor core extends from the housing, wherein the armor wires are arranged inside of the housing so that they are spaced apart at least locally from the conductor core; and a plastic material disposed within the housing and filling interstices each defined by one or more surfaces of one or more of the conductor core, one or more of the armor wires, and the housing.

The rope socket may comprise at least one spacer radially interposing the conductor core and the plurality of armor wires within the housing, and the plastic material disposed within the housing may fill interstices each defined by one or more surfaces of one or more of the conductor core, the at least one spacer, one or more of the armor wires, and the housing. The at least one spacer may comprise a first spacer and a second spacer. The first spacer may be axially offset from the second spacer such that no portion of the second spacer radially overlaps any portion of the first spacer. The at least one layer may comprise: an inner layer comprising a plurality of inner armor wires wound around the conductor core; and an outer layer comprising a plurality of outer armor wires wound around the plurality of inner armor wires. The first spacer may radially interpose the conductor core and the plurality of inner armor wires within the housing. The second spacer may radially interpose the plurality of inner armor wires and the plurality of outer armor wires within the housing. The plastic material may fill interstices each defined by one or more surfaces of one or more of the conductor core, the first spacer, one or more of the inner armor wires, the second spacer, one or more of the outer armor wires, and the housing.

The plastic material may be one of a thermoset material, comprising at least one of polyurethane and epoxy, and a thermoplastic material.

The plastic material may be a polymer matrix embedded with fibrous, particulate, or spherical glass, carbon, aramid, or basalt reinforcement members.

The uphole end of the housing may be defined by a conical surface that narrows to an opening through which the armored cable extends. The at least one spacer may be longitudinally disposed in a volume defined by the conical surface. The housing may comprise a cylindrical member and an upper cap coupled with the cylindrical member, and the upper cap may comprise the conical surface.

The housing may comprise a lower cap coupled with the cylindrical member, and the lower cap may form the downhole end and comprise an opening through which the conductor core extends from the housing.

The housing may comprise a fill port for installing the plastic material within the housing.

The present disclosure also introduces a system comprising and armored cable and an armored cable rope socket. The armored cable comprises: a conductor core comprising one or more conductors for transmitting electrical and/or optical signals between surface equipment at a wellsite surface and downhole equipment suspended by the armored cable in a wellbore that extends between the wellsite surface and a subterranean formation; and at least one layer comprising a plurality of armor wires wound around the conductor core. The armored cable rope socket comprises: a housing having first and second ends, wherein the armored cable extends into the housing through the first end, wherein the conductor core extends from the housing through the second end to a component of the downhole equipment, and wherein the armor wires are arranged inside of the housing so that they are spaced apart at least locally from the conductor core; and a plastic material disposed within the housing and filling interstices each defined by one or more surfaces of one or more of the conductor core, one or more of the armor wires, and the housing.

Each armor wire may comprise a reinforcement element including a bundle of reinforcement fibers comprising at least one fiber and a plastic matrix impregnating the bundle of fibers, wherein the plastic material filling the housing is selected to bond with the plastic matrix of the reinforcement element.

The present disclosure also introduces a method comprising passing an end of an armored cable through an uphole end of a housing, wherein the armored cable comprises: a conductor core comprising one or more cables for transmitting electrical and/or optical signals; and at least one layer comprising a plurality of armor wires collectively extending around the conductor core. Portions of each armor wire of the at least one layer are then unwrapped to expose the conductor core. The unwrapped portions of the armor wires are then rewrapped around the exposed conductor core so that the armor wires are at least locally spaced apart from the conductor core. The housing is then positioned so that the rewrapped portions of the armor wires are located inside the housing. A plastic material is then injected into the housing to fill interstices each defined by one or more surfaces of one or more of the conductor core, one or more of the rewrapped portions of the armor wires, and the housing.

The method may further comprise: after unwrapping portions of each armor wire, positioning at least one spacer to radially interpose the conductor core and the unwrapped portions of armor wires, such that the rewrapping of the unwrapped portions of the armor wires includes wrapping the unwrapped portions of the armor wires around the at least one spacer, and such that the repositioning of the housing positions the at least one spacer within the housing; and affixing a lower cap to the housing after the positioning of the housing and before the injecting of the plastic material.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:
a rope socket coupled with an armored cable, wherein the armored cable comprises a conductor core comprising one or more cables for transmitting electrical and/or optical signals and at least one layer comprising a plurality of armor wires wound around the conductor core, and wherein the rope socket comprises:
a housing having:
an uphole end through which the armored cable extends into the housing;
a downhole end through which the conductor core extends from the housing, wherein the armor wires are arranged inside of the housing so that they are spaced apart at least locally from the conductor core; and
at least one spacer radially interposing the conductor core and the plurality of armor wires within the housing, wherein the at least one spacer comprises a first spacer and a second spacer, and wherein the first spacer is axially offset from the second spacer such that no portion of the second spacer radially overlaps any portion of the first spacer; and
a plastic material disposed within the housing and filling interstices each defined by one or more surfaces of one or more of the conductor core, one or more of the armor wires, and the housing, wherein the plastic material disposed within the housing fills interstices each defined by one or more surfaces of one or more of the conductor core, the at least one spacer, one or more of the armor wires, and the housing.

2. The apparatus of claim 1 wherein:
the at least one layer comprises:
an inner layer comprising a plurality of inner armor wires wound around the conductor core; and
an outer layer comprising a plurality of outer armor wires wound around the plurality of inner armor wires;
the first spacer radially interposes the conductor core and the plurality of inner armor wires within the housing;
the second spacer radially interposes the plurality of inner armor wires and the plurality of outer armor wires within the housing; and
the plastic material fills interstices each defined by one or more surfaces of one or more of the conductor core, the first spacer, one or more of the inner armor wires, the second spacer, one or more of the outer armor wires, and the housing.

3. The apparatus of claim 1 wherein the plastic material is one of a thermoset material, comprising at least one of polyurethane and epoxy, and a thermoplastic material.

4. The apparatus of claim 1 wherein the plastic material is a polymer matrix embedded with fibrous, particulate, or spherical glass, carbon, aramid, or basalt reinforcement members.

5. The apparatus of claim 1 wherein the uphole end of the housing is defined by a conical surface that narrows to an opening through which the armored cable extends.

6. The apparatus of claim 5 wherein: the second spacer is longitudinally disposed in a volume defined by the conical surface.

7. The apparatus of claim 5 wherein the housing comprises a cylindrical member and an upper cap coupled with the cylindrical member, and wherein the upper cap comprises the conical surface.

8. The apparatus of claim 1 wherein the housing comprises a lower cap coupled with a cylindrical member, and wherein the lower cap forms the downhole end and comprises an opening through which the conductor core extends from the housing.

9. The apparatus of claim 1 wherein the housing comprises a fill port for installing the plastic material within the housing.

10. A system comprising:
an armored cable comprising:
a conductor core comprising one or more conductors for transmitting electrical and/or optical signals between:
surface equipment at a wellsite surface; and
downhole equipment suspended by the armored cable in a wellbore that extends between the wellsite surface and a subterranean formation; and
at least one layer comprising a plurality of armor wires wound around the conductor core, wherein each armor wire comprises a reinforcement element including a bundle of reinforcement fibers comprising at least one fiber and a plastic matrix impregnating the bundle of reinforcement fibers; and
an armored cable rope socket comprising:
a housing having first and second ends, wherein the armored cable extends into the housing through the first end, wherein the conductor core extends from the housing through the second end to a component of the downhole equipment, and wherein the armor wires are arranged inside of the housing so that they are spaced apart at least locally from the conductor core; and
a plastic material disposed within the housing and filling interstices each defined by one or more surfaces of one or more of the conductor core, one or more of the armor wires, and the housing, wherein the plastic material filling the housing is selected to bond with the plastic matrix of the reinforcement element.

11. A method comprising:
passing an end of an armored cable through an uphole end of a housing, wherein the armored cable comprises:
a conductor core comprising one or more cables for transmitting electrical and/or optical signals; and
at least one layer comprising a plurality of armor wires collectively extending around the conductor core;

then, unwrapping portions of each armor wire of the at least one layer to expose the conductor core;

then, rewrapping the unwrapped portions of the armor wires around the exposed conductor core so that the armor wires are at least locally spaced apart from the conductor core;

then, positioning the housing so that the rewrapped portions of the armor wires are located inside the housing; and then, injecting a plastic material into the housing to fill interstices each defined by one or more surfaces of one or more of the conductor core, one or more of the rewrapped portions of the armor wires, and the housing.

12. The method of claim 11 further comprising:

after unwrapping portions of each armor wire, positioning at least one spacer to radially interpose the conductor core and the unwrapped portions of the armor wires, such that the rewrapping of the unwrapped portions of the armor wires includes wrapping the unwrapped portions of the armor wires around the at least one spacer, and such that the repositioning of the housing positions the at least one spacer within the housing; and affixing a lower cap to the housing after the positioning of the housing and before the injection of the plastic material.

* * * * *